United States Patent [19]

Baills et al.

[11] Patent Number: 4,591,138

[45] Date of Patent: May 27, 1986

[54] JOINTED PNEUMATIC GRIPPING APPARATUS

[75] Inventors: Jean M. Baills, Chatenois; Georges Cretien, Belfort, both of France

[73] Assignee: Etudes Techniques-Franche-Comte-Alsace Etfa, Sarl, Belfort, France

[21] Appl. No.: 677,541

[22] Filed: Dec. 3, 1984

[30] Foreign Application Priority Data

Dec. 2, 1983 [FR] France ............................ 83 19443

[51] Int. Cl.⁴ ........................................ B23Q 3/03

[52] U.S. Cl. ........................................ 269/32

[58] Field of Search ................ 308/3 A, 3 R, DIG. 8; 269/32, 27, 24, 285, 239, 228, 91, 93, 98

[56] References Cited

U.S. PATENT DOCUMENTS

| | | | |
|---|---|---|---|
| 3,938,852 | 2/1976 | Hein et al. | 308/3 R |
| 4,331,326 | 5/1982 | Strouss . | |
| 4,392,642 | 7/1983 | Chitayat | 269/285 |
| 4,458,889 | 7/1984 | McPherson et al. | 269/32 |
| 4,529,255 | 7/1985 | Piotrowski | 308/3 A |

FOREIGN PATENT DOCUMENTS

| | | |
|---|---|---|
| 2075670 | 10/1971 | France . |
| 2340798 | 9/1977 | France . |
| 2484310 | 12/1981 | France . |
| 2103119 | 2/1983 | United Kingdom . |

*Primary Examiner*—Robert C. Watson

*Attorney, Agent, or Firm*—Young & Thompson

[57] ABSTRACT

The present invention relates to a jointed pneumatic gripping apparatus. The apparatus is characterized in that the intermediate guiding element (8) is elastically deformable during the gripping stage, in particular when passing overcenter beyond the aligned position.

4 Claims, 2 Drawing Figures

JOINTED PNEUMATIC GRIPPING APPARATUS

The present invention relates to the field of gripping pieces by clamping, in particular sheet metal parts to be assembled by welding, and has as its object a toggle jointed pneumatic gripping apparatus.

At present, the existing apparatus of this type generally referred to as "gripping apparatus" are basically comprised by a hydraulic or pneumatic jack acting by means of a head on a coupling rod joined to a clamping arm by means of an axle, the head being guided in a body joined to the body of the jack and enclosing the coupling rod.

In these known apparatus, the blocking of the clamping arm in service position is made irreversible by the passing overcenter of the axes of the clamping rod in the manner of a toggle joint.

However, in these apparatus, the third axis is usually replaced by the contact surface either of the head with the body, or of one or several control rollers joined to the head with the body, so that passing the alignment position requires the action of considerable forces which tend to deform the guiding surface of the head as well as to cause a rapid wearing of the various bearings of the clamping rod, so that the gripping precision in the case of a change in the thickness of the sheet metals to be gripped, and the maintenance of a constant tightening force are practically impossible to ensure over a long term. Moreover, in these known gripping apparatus, the release of the clamping arm is often difficult due to the locking forces which have to be overcome, requiring a greater size for the control jack leading to a corresponding rise in the cost.

The object of the present invention is to overcome these drawbacks.

In fact, it has as its object a jointed pneumatic gripping apparatus basically comprising a clamping body constituted by two half-shells joined to each other, and in which a head is slidingly mounted which operates a coupling arm by means of a lever, and a jack which is connected with the coupling body and has its piston rod joined to the head which is guided in the coupling body against a bearing surface of this body by means of an intermediate guiding element, characterized in that the intermediate guiding element is elastically deformable during the gripping stage, in particular when passing beyond the alignment position.

According to a characteristic of the invention, the intermediate guiding element comprises two rails each of which is fixed to the bearing surface of a half-shell of the coupling body with interposition of an elastically deformable member or compression springs.

Figure 1:
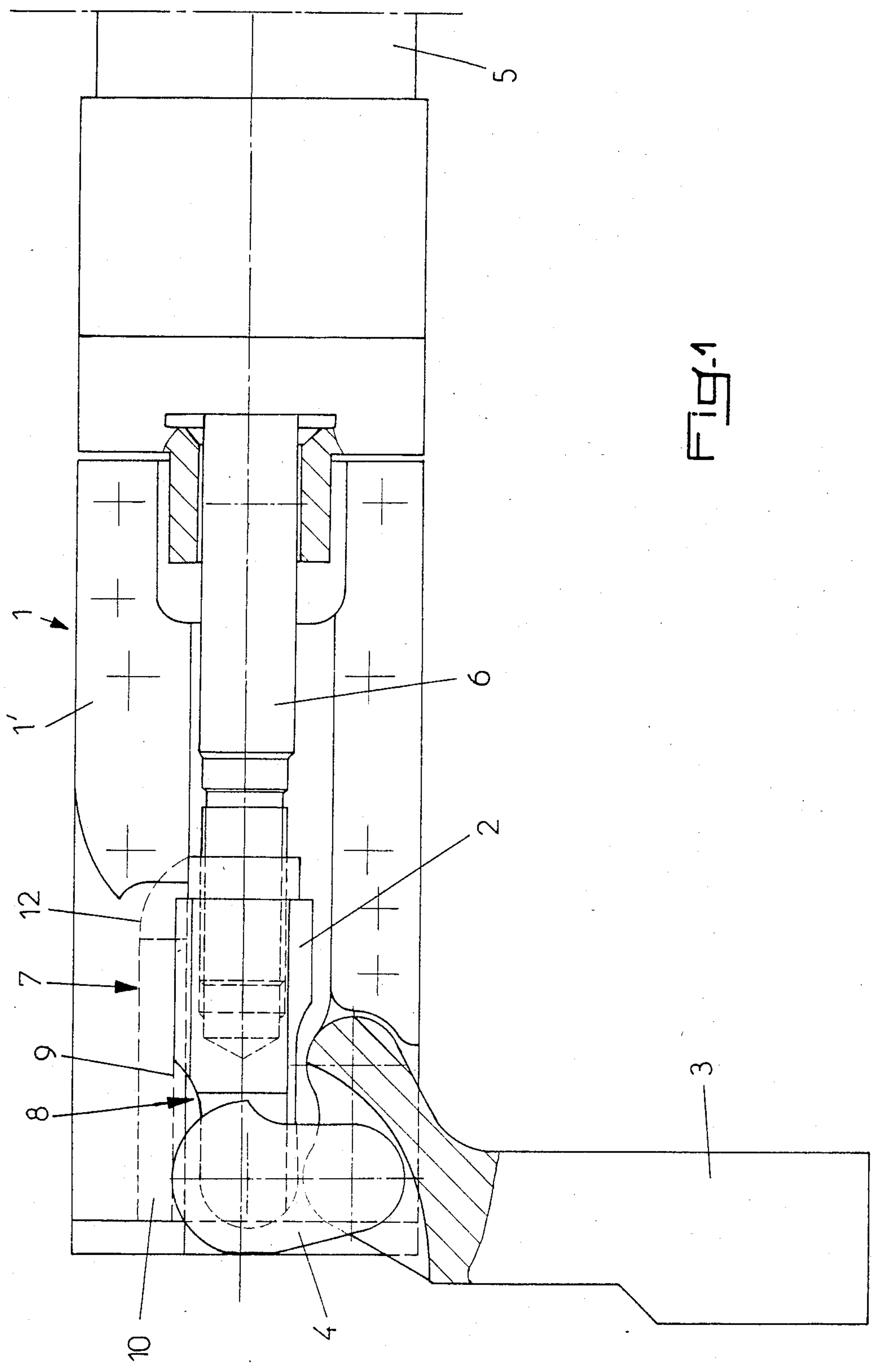
Figure 2:
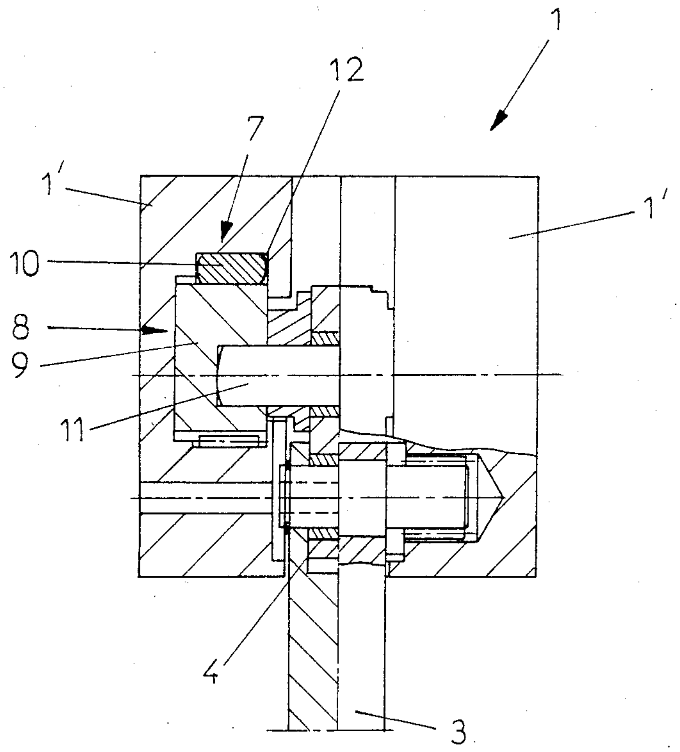

The invention will be better understood from the following description referring to a preferred embodiment given as a non-limiting example and explained with reference to the accompanying schematic drawings, in which:

FIG. 1 is a sectional view and side elevational view of an apparatus according to the invention, and FIG. 2 is a front elevational view partly in section of the apparatus according to FIG. 1.

According to the invention, and as shown in particular in FIG. 1 of the accompanying drawings, given as an example, the jointed pneumatic gripping apparatus which comprises basically a coupling body 1 constituted by two half-shells 1' joined to each other, and in which a head 2 is slidably mounted, said head operating a coupling arm 3 by means of a lever 4, and a jack 5 connected with the coupling body 1, the piston rod 6 of said jack being joined to the head 2 which is guided in the coupling body 1 against a bearing surface 7 of this body by means of an intermediate guiding element 8, said gripping apparatus is characterized in that said intermediate guiding element 8 is elastically deformable during the gripping stage, in particular when passing beyond the alignment position.

The element 8 is advantageously constituted by two rails 9 each of which is fixed to the bearing surface 7 of a half-shell 1' of the body 1 with interposition of an elastically deformable element 10 (FIG. 2). This element 10 is preferably made of natural or synthetic rubber, or of any other material having elastic deformation properties. It is also possible to replace the element 10 by compression springs which are, on the one hand, lodged in cavities provided for this purpose on the bearing surface 7 of the half-shells 1' or on the bottom side of the rails 9 and, on the other hand, bearing with their other end on the bottom side of the rails 9 or on the bearing surface 7.

The rails 9 are advantageously U-shaped rails on which the ends of the axle 11 for joining the head 2 with the lever 4 for operating the clamping arm 3 are guided, and the element 10 is preferably lodged in a longitudinal groove 12 of the bearing surface 7 of each half-shell 1' (FIG. 2).

According to a different embodiment of the invention, not shown in the accompanying drawings, the element 8 can alternatively be constituted only by rails made of an elastically deformable material and having a great surface resistance such as resilient steel or a composite material, for instance made of carbon fibers, these rails resting only with their two end portions on segments of the bearing surface 7 of each half-shell 1'.

According to another embodiment of the invention, the element 8 is constituted by stacks of leaf springs bearing at their ends on segments of the bearing surface 7 of each half-shell 1', and on which segments the corresponding end portions of the axis 11 slide or roll.

Furthermore, it is also possible to constitute the element 8 by rails fitted with their ends facing the jack 5, or pivotally mounted at this end, and bearing with their other ends on an elastically deformable element or a compression spring joined to the bearing surface 7 of each half-shell 1'.

During the gripping stage, when the axle arrives at the alignment point, that is, when a line perpendicular to the point of contact of the head 2 with the bearing surface 7 of the body 1 passes through the axle 11 and the axis of connection of the lever 4 with the clamping arm 3, that is, when there is effectively a prop effect, there is a force component which tends to crush the rail 9 on the element 10, so that the force obtained on the arm 3 can be substantially reduced, and the pressure/-load bend/curve of said arm 3 does not have any undesirable peaks.

Thanks to the invention, it is possible to construct a jointed pneumatic gripping apparatus having a negligible wearing of its elements during its operation, which allows obtaining a constant gripping, and which requires relatively weak opening force with respect to existing gripping apparatus having the same gripping capacity.

Of course, the invention is not limited to the described embodiment represented in the accompanying drawings. Modifications are possible, especially in the construction of the various elements or by substitution of equivalent techniques without departing from the scope of the present invention.

We claim:

1. In a jointed pneumatic tightening apparatus comprising a clamping body (1) of two half-shells (1') joined to each other in which is slidably mounted a head (2) actuating a clamping arm (3) by means of a lever (4), the head (2) and lever (4) being pivotally interconnected about a first axis, the clamping arm (3) and lever (4) being pivotally interconnected about a second axis parallel to said first axis, and a jack (5) connected to the clamping body (1), and whose piston rod (6) is joined to the head (2) which is guided in the clamping body (1) against a bearing surface (7) of this latter, by means of an intermediate guiding element (8); the improvement in which the intermediate guiding element (8) is elastically deformable during gripping when said first and second axes are disposed in a plane perpendicular to said piston rod (6).

2. Apparatus according to claim 1, in which the intermediate guiding element (8) is constituted by two rails (9) each fixed to the bearing surface (7) of a half-shell (1') of the clamping body (1) with interposition of an elastically deformable element (10).

3. Apparatus according to claim 2, in which said element (10) is made of rubber.

4. Apparatus according to claim 2, in which the rails (9) are U-shaped rails in which the end portions of an axle (11) for joining the head (2) and the lever (4) for operating the clamping arm (3) are guided, and the element (10) is mounted in a longitudinal recess (12) in the bearing surface (7) of each half-shell (1').

* * * * *